United States Patent [19]

Murray

[11] 4,436,498

[45] Mar. 13, 1984

[54] APPARATUS FOR CURING CONCRETE PRODUCTS

[75] Inventor: John A. Murray, Norristown, Pa.

[73] Assignee: Conger/Murray Systems, Inc., Palm Beach, Fla.

[21] Appl. No.: 344,608

[22] Filed: Feb. 1, 1982

[51] Int. Cl.³ .......... B29C 25/00

[52] U.S. Cl. .......... 425/73; 264/82; 264/DIG. 43; 425/75

[58] Field of Search .......... 264/82, DIG. 43; 425/73, 75

[56] References Cited

U.S. PATENT DOCUMENTS 4,093,690 6/1978 Murray .......... 264/82

4,117,059 9/1978 Murray .......... 264/82

*Primary Examiner*—Donald E. Czaja

*Assistant Examiner*—Mary A. Becker

*Attorney, Agent, or Firm*—Austin R. Miller

[57] ABSTRACT

A method and apparatus for rapidly manufacturing concrete or like products having an advanced state of cure by blending together a calcareous cementitious binder, aggregate, and water to form a mix, molding the mixture to have a predetermined shape and exposing the shape to an atmosphere in a chamber consisting essentially of carbon dioxide gas, wherein carbon dioxide gas is fed under controlled conditions into said chamber through a series of tubes having a multiplicity of spaced orifices during the movement of the shape therein and continuing the feed so as to cause an exothermic temperature rise in the shape.

9 Claims, 4 Drawing Figures

APPARATUS FOR CURING CONCRETE PRODUCTS

BACKGROUND OF THE INVENTION

This invention relates to a method and apparatus for the manufacture of concrete and like products, particularly, concrete and cinder block, and substantially all other conventional building products and the like. More particularly, this invention relates to a method and apparatus for curing concrete products using a carbon dioxide atmosphere.

The term "concrete", as it is employed in this specification, refers to a stone-like product obtained by blending a cement, aggregate such as sand, gravel, crushed stone, and many other like additives, and water together in appropriate amounts, and allowing the mixture to harden and reach an advanced state of cure. "Concrete-like" is extremely broader, and encompasses the materials having certain physical properties of concrete products, having perhaps substitutes for aggregate normally so used. They may be load-bearing or non load-bearing and may if desired include binders and/or aggregates that are selected to impart desired structural characteristics and/or decorative characteristics to the final product.

DESCRIPTION OF THE PRIOR ART

In the prior art method of manufacturing concrete products, for example, the cement, aggregate, additives if any, and water are blended in various ratios. In general, a sufficient amount of water is added to completely hydrate the cement and also to impart a degree of fluidity (substantial liquidity) to the blended mixture generally referred to as a wet mix. The blended mixture is then poured or compacted into a form and allowed to take an initial set. The initial set usually occurs within ½ hour to 4 hours, depending upon the temperature and the particular concrete mixture employed. The concrete product, after this initial set, is solid, but has very little strength. In order to obtain the maximum strength possible with a given concrete composition using the prior art manufacturing techniques, the concrete is generally allowed to cure for a period of time from several days, to several weeks.

The excessively long period of time required for both the initial set, and particularly for the development of the ultimate strength, causes considerable problems in the manufacture of cast concrete products. The concrete mixture must remain in the mold until the product acquires sufficient strength that it will not fall apart when the mold is removed. Furthermore, the concrete product, even after the mold is removed, must be allowed to cure for an extended period of time before it is subjected to any substantial stresses. The need to maintain the concrete products in the mold until the initial set is obtained, and for curing the products until the ultimate strength is developed requires a substantial inventory of molds and a rather large storage area for the products being processed. Of even greater consequence is the cost involved in the prior art processes since the handling of weak products obtained after the initial set and the storage of products for several days or weeks until fully cured is quite costly in both manpower and storage space. Often, of even greater consequence is the cost in terms of rejects or of imperfections in the products due to internal stresses and even fractures that result from handling a weak product. Other deficiencies in prior art techniques include the shrinkage characteristics of the panels, especially high shrinkage during an extended period of cure, and differential shrinkage rates, e.g., between the outer surface and the inside of the product.

In the conventional method, a concrete mixture containing the desired type of aggregate is either poured or compacted into a suitable mold. The mold is then stored until the mixture initially sets. This usually requires a discontinuous process, rather than a continuous sequence of steps.

Attempts have heretofore been made to decrease the cure time in the manufacture of concrete and like products. Such attempts have included the various types of accelerators that have been added to concrete mixtures, as well as heating and steaming processes, during manufacture. These methods at best have produced marginal improvements with respect to reducing the curing time and have been somewhat expensive. For example, in high pressure steam with or without carbon dioxide gas, curing the product required a period of twelve to twenty-four hours, in order to obtain a satisfactory hardness and strength in the final product. In addition, certain of the processes had adverse effects upon the composition. High pressure steaming of concrete products containing substantial amounts of marble or limestone, for example, causes a very marked decrease in the ultimate compressive strength of the final product.

In order to increase the strength of concrete products, certain additives have heretofore been suggested. These additives include materials which to some extent plasticize the finished concrete product so as to increase its compressive strength. Additives have been suggested to improve the properties of concrete products, including bituminous materials and various types of rubbers and emulsions of synthetic resins. However, such additives do not reduce the curing time to any substantial degree.

Other prior art techniques have been developed that are usable, to a certain degree, with certain of the processes that have been developed for many of the materials set forth above. For example, it is known to treat certain concrete-like products with carbon dioxide gas, by storing the products in a chamber that has been pre-charged with gas, for the purpose of effecting a skin cure on the surface of the products, and of a limited depth of cure, sufficient to enable further handling of the products. Indeed, generally, with the formation of a skin cure, that cure in itself inhibits deeper curing by the use of the carbon dioxide gas.

Other treatment processes have been developed, such as the use of alternate exposure to steam and carbon dioxide gas. The use of steam, however, requires additional cost for investment, and use which increases the cost of manufacturing the product.

Prior art techniques of applying carbon dioxide gas to the concrete-like products have also caused inhibition of the carbonization and hydration reaction along spots on the product where freezing has occurred or water has not been permitted to escape so as to permit the hydration reaction to continue.

OBJECTS OF THE INVENTION

The present invention is directed to the provision of an accelerated curing process for concrete and concrete-like products, after the ingredients are compressed by exposure of the shaped ingredients to carbon dioxide gas until an advanced state of cure throughout the shape is obtained.

An article thus reaching an advanced state of cure may be sufficiently self-sustaining in its shape that it can be lifted without crumbling, for example, by vacuum or suction cup techniques or the like, for removal to subsequent treatment or storage stations, and preferably for early use thereafter.

Accordingly, it is a primary object of this invention to provide an improved method for making substantially cured concrete and concrete-like products.

It is a further object of this invention to provide a novel apparatus for making improved quality concrete and concrete-like products.

It is another object of this invention to provide an advanced state of cure of concrete and concrete-like products without the presence of surface condensation and spot retardation of the carbonization and hydration reactions.

It is a further object of this invention to provide an apparatus and method for rapidly producing high quality concrete and concrete-like products, wherein the products may reach an advanced state of cure throughout the entire product at an early time.

Other objects and advantages of the present invention will become readily apparent to those skilled in the art from a reading of the following brief descriptions of the drawing figures, detailed descriptions of the preferred embodiments and the appended claims.

The term "concrete" as it is employed in this specification, refers to a stone-like product obtained by blending a cement, aggregate such as sand, gravel, crushed stone and other like additives, and water together in appropriate amounts and allowing the mixture to harden and reach an advanced state of cure. Concrete-like is much broader, and encompasses materials having certain physical properties of concrete products, having, in some cases, substitutes for the aggregate normally so used. They may be load-bearing or non-load-bearing and may, if desired, include the binders and/or aggregates that are selected to impart desired structural and/or decorative characteristics to the final product.

Furthermore, by way of background, it will be noted that concrete and concrete-like products continue to undergo curing for an indefinitely long period of time, perhaps thirty years or more. In this application, when reference is made to the "substantially fully cured", "cured", "fully cured" or the like products, it will be understood that what is intended is that the cure is sufficiently advanced to enable not only handling of the product, but also further movement and perhaps processing thereof, while in that state of cure, without the product breaking, crumbling or disintegrating and that curing continues over a long period of time thereafter toward a complete cure.

SUMMARY OF THE INVENTION

The present invention is directed toward providing method and apparatus, wherein calcareous cementitious binder, such as cement or other binders, aggregate, and a minor amount of water are blended, shaped and then treated with carbon dioxide gas in a chamber, during which a rapid exothermic reaction takes place wherein the ingredients undergo an advanced state of cure throughout the entire shape in a short period of time, sufficient to enable the complete hardening thereof.

More particularly, the present invention relates to a method and apparatus for controlling the application of carbon dioxide gas to a cementitious product so as to cause the product to undergo an advanced state of cure in a short period of time without surface condensation or spot retardation of the carbonization and hydration reactions which take place therein.

In accordance with the present invention there has been discovered that substantially complete uniform curing of cementitious products by carbon dioxide can be advanced in a curing chamber by controlling the method and the rate of exposure of the cementitious product to carbon dioxide gas. It has now been found that overexposure to carbon dioxide gas can inhibit the carbonization and hydration reactions which are required to cure the product. This is due to inhibition in releasing the water formed in the reactions and to chilling the product and preventing the exothermic hydration reaction from proceeding because of overexposure. Furthermore, in order to obtain a uniformly cured product it is necessary that the carbon dioxide gas be applied to the cementitious product in a manner whereby the product is covered by the gas but the water released in the hydration reaction is permitted to escape.

BRIEF DESCRIPTION OF THE DRAWINGS

The present invention will be more clearly understood by reference to the drawings wherein.

Figure 1:
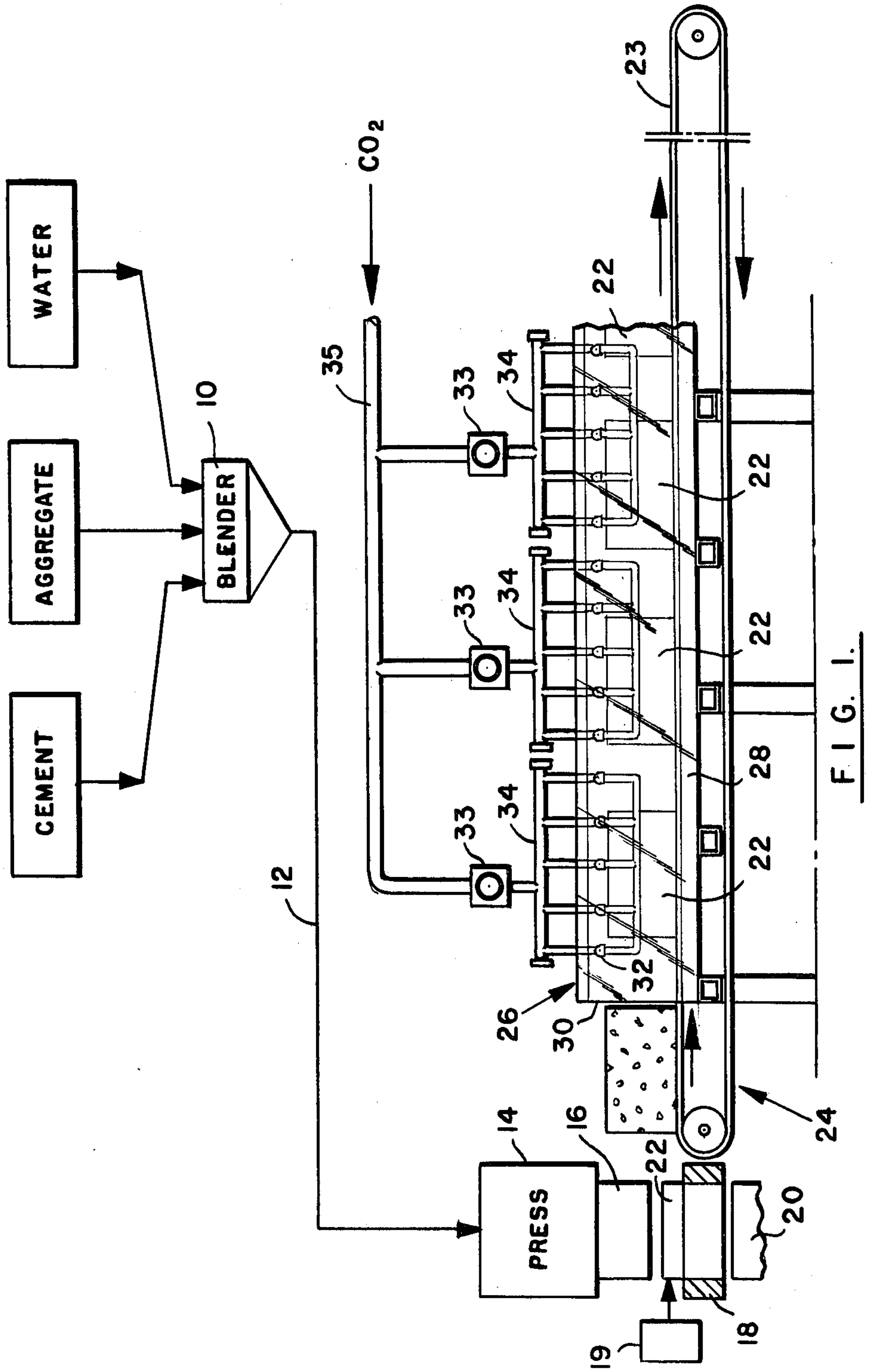
FIG. 1 is a schematic illustration which illustrates sequential stages in the manufacture of a cementitious product, in accordance with the method and apparatus of the present invention.

As indicated in FIG. 1 of the the drawings, a cementitious mix is uniformly blended, by continuing a mixing operation with respect thereto. Preferably, the moist mixture thus obtained is relatively dry, as compared to fluid, soupy mixtures generally employed to make concrete products, in accordance with prior art techniques. Also, for use in this invention, the mixture preferably should have a relatively stiff consistency.

The particular type of blending apparatus employed to obtain the starting mixture is not critical providing it sufficiently blends the starting materials. One type of blender which has, however, proven to be satisfactory is a turbine mixer, the delivery to which is accomplished by a screw conveyor since this provides a very complete mixture of the starting materials in a short period of time. Alternatively, a double screw blender could be utilized. In addition to the blender 10, a screw feeder can be provided in the feed-line 12 to both further mix the ingredients of the mixture and also to facilitate the transfer and metering of the mixed material to the press 14. Alternatively, the feed-line 12 could perform no substantial mixing, but function only as a conveying device.

The press 14 is preferably of the type which can press the moist mix obtained so as to provide a given shape that is capable of being sustained during the remainder of the operation. Positioned below the controlled-motion upper compressive member 16 of the press 14 is a mold 18. The mold shown is for making building blocks. Associated with the mold 18 is a removing or discharging means 20 for removing the pressed, uncured block 22 from the mold 18. The discharging, removing, or ejecting means may vary from the type 20 illustrated in FIG. 1 of the drawings, and for example, may comprise a vacuum or suction lift from the press 14 through the member 16, separately or in addition to the type 20, to facilitate a removal or a discharge of the blocks from the mold without unduly stressing the blocks or other forms, and most particularly, without causing internal fractures therein. Assisting the discharging means 20, after the ejection means has upwardly lifted a given block such as 22, is a moving means 19, that may preferably comprise a component of the press, that facilitates the moving, depositing, or other transportation of the block or the like 22 onto an upper run 23 of a conveyor belt 24. It will be understood, that by making modifications in the upper compressive member 16, and in the mold 18, any suitable building structure may be compressed in the press. Accordingly, while the press, and the conveyor and chamber of this invention are illustrated with respect to their adaptability for making blocks or the like, such should not be construed as being limiting, but only as representative of a particular type of product being processed.

The moist starting material, prepared as discussed hereinabove, is fed into the mold 18, and in a weighed amount sufficient to make a panel, block, brick, etc., or the like of the desired thickness. The mold 18 is positioned below the member 16, and the press is activated. The member 16 compresses the mixture into a compacted shape 22, such as a block or the like, which has sufficient structural integrity to be removed from the mold by the suction ejector means 20, or the like, in cooperation with the transfer means or depositing means 19 or the like, without the shape 22 breaking apart.

After depositing the shape 22 onto the upper run 23 of the conveyor 24, the shape 22 is advanced rightward, as viewed in FIG. 1, while resting and being carried on the upper run 23 of the conveyor 24. Preferably, the temperature of the shaped cementitious product should be about 60–65° F. prior to entering the carbon dioxide curing chamber. When the cement in the blender 10 is fed to the mold 18 at a temperature between about 60–65° F., the resultant shape 22 possesses sufficient green strength to maintain its shape even with handling. This is due to the fact that the cementitious mixture must be at least 45° F. for hydration to begin. Having the mix at a temperature between about 60–65° F. prior to entering the curing chamber permits the formed configuration to have sufficient hardening, especially when the amount of water in the mix is kept to a minimum. In order for the block 22 to have the desired temperature prior to entering the curing chamber, any conventional means may be provided so as to preheat the mix or the shaped product.

The block 22 is then advanced into a carbon dioxide chamber 26. The chamber has sides 27, along both sides of a conveyor belt 24, and a lower end 28, and its entry and exit ends which may be open to allow the escape of excess water vapor.

Figure 3:
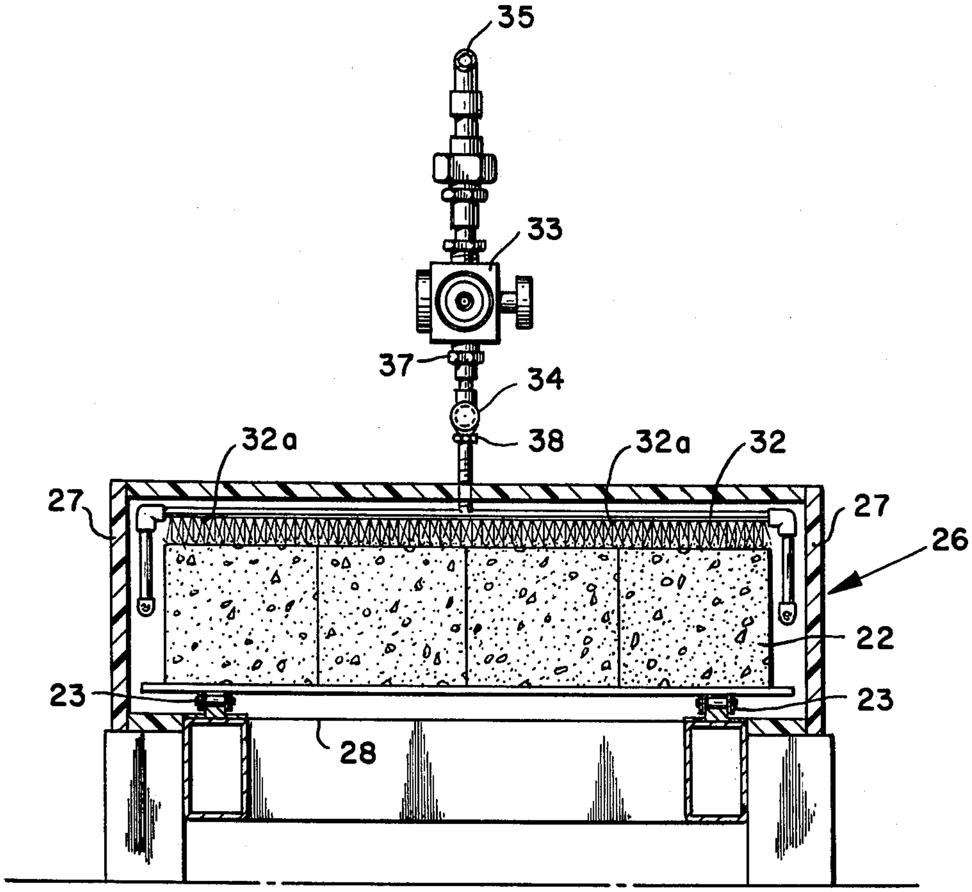
FIG. 3 is a cross-sectional view of the curing chamber taken along line III—III of FIG. 2.
Figure 4:
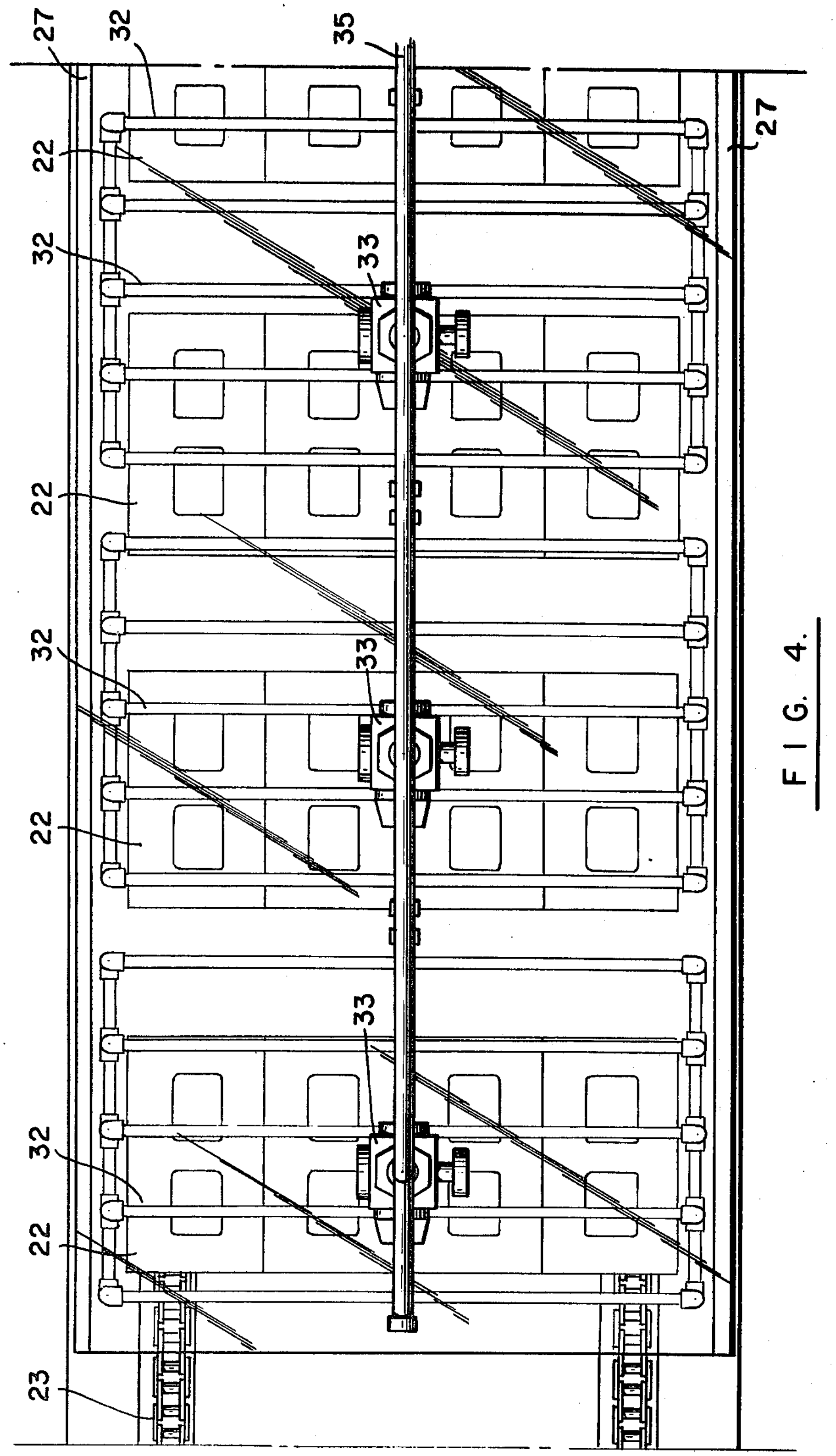
FIG. 4 is a top view of the chamber of FIG. 2.

As seen in FIGS. 1 and 4, the chamber 26 is provided with a plurality of tubes 32 having a multiplicity of spaced inlets 32*a* for carbon dioxide gas, with such tubes 32 and inlets 32*a* (FIG. 3) being provided at the top of the chamber 26, in order to obtain an even gas flow and distribution over the entire article.

For maximum benefit of the processes and apparatus of this invention, the relative height of the tubes 32 from the blocks 22 is a highly important factor, in effecting the advanced state of curing substantially completely throughout the thickness of the shapes. That is, in order to obtain the maximum benefits of this invention, the distance of the upper tubes from the shape should be relative to the size of the orifice through which the carbon dioxide gas is emitted as will be hereinafter described.

In accordance with a preferred feature of the present invention, there is utilized ultracold carbon dioxide gas, namely, carbon dioxide gas which is at a temperature of about 0° to −69.9° F. It has been discovered that the use of ultracold carbon dioxide produces radically improved results despite the apparent conflict between low carbon dioxide temperature and the necessarily relatively high temperature of the cementitious mixture. Surprisingly, when ultracold gas is used under controlled circumstances it does not disturb or hinder the ensuing cementitious reactions but surprisingly enhances them instead. It is believed that unexpected advantage is obtained because the use of ultracold carbon dioxide gas results in a gas having a greater density of carbon dioxide molecules at atmospheric pressure. Consequently, there is a greater concentration of carbon dioxde molecules around the shaped block. The carbonation and hydration reactions take place quickly with an exothermic reaction, whereby the temperature of the block increases.

It is not advisable to dilute the carbon dioxide gas fed to the curing chamber since a lower $CO_2$ concentration reduces the curing speed.

Although it is preferable to maintain a humid atmosphere within the curing chamber, usually no additional moisture is required. Water is liberated as a result of the carbonization and hydration reaction. It is further advisable to limit the exposure of the blocks 22 to the carbon dioxide for a period of no more than 5 minutes, preferably about 1–2 minutes so as to avoid overexposure which leads to condensation of water on the block surface. Release of water (humidity) from the block is important and advantageous.

The carbon dioxide supplied to the chamber 26, through the tubes 32 thereof may be obtained from any convenient source. Bottled carbon dioxide gas is the most conveniently used in most installations. The gas should be comprised essentially of carbon dioxide with at most minor amounts of other gases being present. The pressure of the carbon dioxide which is maintained inside the chamber is substantially at atmospheric pressure or zero pounds per square inch gauge.

It will be appreciated accordingly that great advantages are obtained by providing a multiplicity of relatively small orifices, extending across the chamber above the blocks. In this manner the carbon dioxide gas is introduced at relatively high orifice velocity through a multiplicity of small orifices, thus distributing the gas substantially uniformly across the chamber above the block. This causes the gas within the chamber to flow slowly, substantially by gravity, down and around the block. By utilizing this feature of the invention it is possible to avoid blanketing the blocks with carbon dioxide in such a manner as to prevent the escape of the water of reaction from the block and/or the freezing of certain areas on the block.

It is preferred to operate the process of this invention with the carbon dioxide being delivered through the ports 32*a* at a sufficiently low gauge pressure, e.g. 0 (bleed) to 10 PSIG, so that the pressure within the chamber 26 is at atmospheric pressure or substantially at atmospheric pressure, but not below. This will allow the carbon dioxide gas to engulf or enshroud the blocks 22 and to seep or billow out of the inlet end 30 of the chamber 26, for the purpose above discussed, and to prevent the infusion of atmospheric air, especially in undesired amounts, into the chamber. This is because the composition of atmosphere inside the chamber 26 should be essentially carbon dioxide and water vapor (humidity). Under ideal conditions, the carbon dioxide content of the atmosphere inside the chamber 26 should be at least 95%, and preferably higher, for example, 98% plus, excluding variable amounts of water vapor released from the cementitious mixes.

Figure 2:
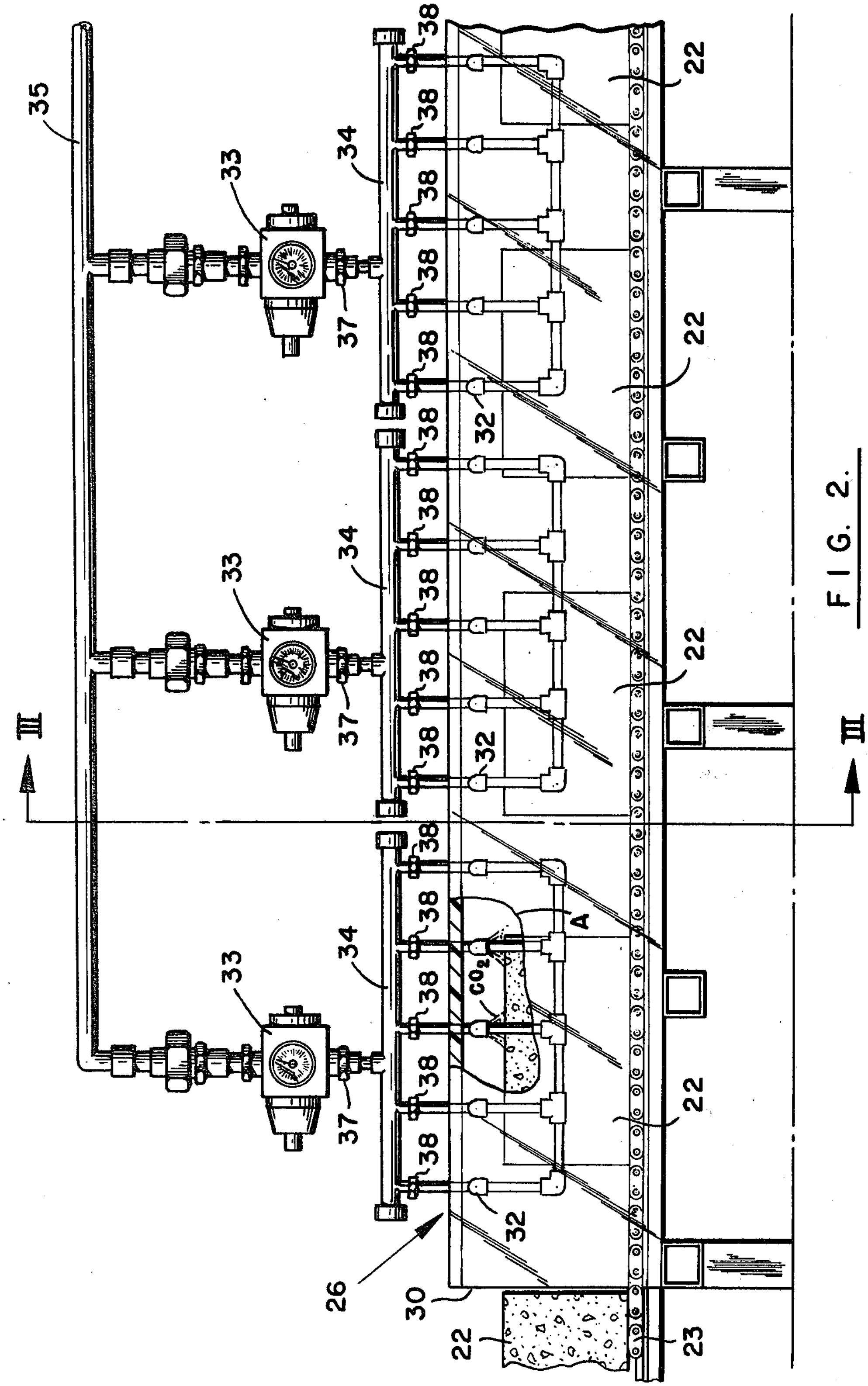
FIG. 2 is a partially broken away enlarged side view of the curing chamber of FIG. 1.

The temperature of the gas as it emerges from the tubes 32 is preferably about 0° to minus 70° F. Because of the relatively high temperatures of the work objects, the heat of reaction and the release of water vapor in the chamber, the temperature of the introduced carbon dioxde increases with time while the carbon dioxide is in the chamber. In order to provide a uniform and controlled application of carbon dioxide gas to the product 22 in the chamber 26, the arrangement shown in FIGS. 1 and 2 may be utilized. Carbon dioxide gas from a central source passes through line 35 through at least one pressure regulator, preferably, a series of pressure regulators 33, which emit the gas under a fixed pressure to a distribution manifold 34 which distributes the gas equally to a plurality of tubes 32. Through the use of the series of pressure regulators, it is possible to treat a variety of shapes without overexposure to the carbon dioxde gas by regulating its emission rate throughout the chamber. Furthermore, the series of pressure regulators also allows for a steady even flow or if required a differential flow rate throughout the chamber when required in order to obtain a uniformity in the treatment. The distribution manifold is optional since the gas can be passed directly to the tubes 32 from a pressure regulator.

It is also important that the tubes 32 be spaced from each other in order to permit water from the carbonization and hydration reactions to escape and avoid condensation on the surface of the blocks 22 as noted in area A. Preferably, the tubes 32 are spaced apart between about 4" to about 7" in the case of building blocks and arranged substantially perpendicular to the direction of travel of the blocks 22.

The adjustment of the height of the tubes 32 from the blocks 22 may either be by raising and lowering the manifold such as by example utilizing the adjusting nuts 37 connecting the manifolds and pressure regulator and/or the adjustment nuts 38 on each of the tubes 32.

From FIG. 3 it can be noted that the spacing of the orifices **32*a* together with their size is important in order to obtain a uniform distribution of the carbon dioxide gas over the blocks 22 while avoiding a condensation on the blocks which may freeze and retard carbonization and hydration in spots on the block surface. The orifices 32*a* should be spaced about ¾"-1½" from each other, preferably, in the case of blocks, about 1" apart. It has been noted that the greater the distance between the orifices 32*a*, the further it is necessary to space the tubes 32 from the block 22 in order to obtain a uniformity in applying the carbon dioxide gas to the blocks 22** without chilling.

The size of the orifices **32*a* must also be considered when determining the height of the tubes 32 from the block 22 in order to avoid condensation. The larger the size of the orifice, the closer the tubes 32 are placed to the blocks 22**. When treating building blocks, the orifices should be about 1/16" to about 5/64" in diameter, preferably about 3/64".

It should also be appreciated that there is a close interrelationship between the amount of water used in the starting mixture and the carbon dioxide. If an amount of water substantially in excess of that necessary for the article to retain its shape is employed, the mixture will not cure well in the carbon dioxide chamber. This is believed to be due to a lack of relative solubility of the carbon dioxide in water, and also because the excess water freezes and prevents the carbon dioxide from penetrating into the concrete mixture being cured.

It is also believed that an excess of pressure of carbon dioxide within the chamber 26 may result in a rapid skin or shell cure or crusting that will subsequently prevent carbon dioxide gas from penetrating the shape to interior portions, thereby preventing curing of the interior portions of the shape.

It has been found that, because the carbon dioxide gas works best in a slightly moist atmosphere (the moisture coming from the work objects), for the desired advanced state of cure with respect to the interior of the shapes being cured, the chamber must be of the type that will permit the generation of moisture in the environment therein during the reaction, and that will retain and continue to regenerate such moisture in the chamber's carbon dioxide environment, from the reacting blocks. Advantageously, the chamber is of a transparent plastic material, for example, plexiglas.

In spite of the fact that a relatively low amount of water is employed in the mixture, the substantially cured material is often found to have free water on its surface after an advanced state of curing has been achieved. This is believed to be due to a combination of interrelated reactions. The initial reaction is believed to be the hydration of the oxides of the cement by the water, which is then followed by a rapid carbonization of the resulting hydroxides by the carbon dioxide. The result is that the hydrate formed by hydration of the oxide is then converted into the corresponding carbonate, and the water initially used in the hydration reaction is freed and can react with additional unreacted oxide. In theory, if both the hydration reaction and the carbonization reaction go to completion, the entire amount of water added to the starting mixture should be recovered as free water. This would, of course, account for the presence of water on the surface of some substantially cured materials. Therefore, freezing of the water on the surface should be avoided to prevent spot retardation. While the above theory appears to be the logical explanation of the chemistry involved, it should be appreciated that applicant does not intend to limit his invention to the above theoretical explanation of the process.

The rapid curing with the resulting improved properties has made it possible to continuously manufacture concrete products, on a one-after-another or serial basis, which are ready for immediate shipment and early use as soon as they are cured in the carbon dioxide chamber. Thus, the curing chamber may be set up immediately downstream of the forming mold and, immediately after exit of the shapes from the chambers, they may be subjected to grinding, polishing, operations, or other finishing operations as desired, some of which subject the shapes to vigorous treatment, for example, polishing and abrading, together with exposure to streams, a physical treatment which would ordinarily disintegrate shapes prepared by prior art techniques, unless those shapes had been allowed to cure for a period of weeks, or months, for example.

Thus, while this invention has been described with particular emphasis on the manufacture of cement block, and the like, the use of the method and apparatus of this invention is clearly not limited to the manufacture of blocks, or of any other building or construction material, but the method steps and apparatus of this invention can be used to produce a wide variety of different types of concrete and concrete-like products as have been discussed throughout this application.

The following Example is given by way of further illustration of one method of the present invention and is not intended in any way to limit the scope of the present invention beyond that of the subjoined claims. All parts and percentages expressed in the following Examples are parts and percentages by weight, not volume, unless otherwise indicated.

EXAMPLE

Building blocks were prepared from the following mixture:

Crushed concrete: 21.3 kgs.
Crushed burnt face brick: 10 kgs.
Ground limestone: 20 kgs.
Portland cement: 7 kgs.
Water: 4 kgs.

The mixture was blended with the water being at a temperature of 65° F. and pressed into blocks 8"×8"×16" thick.

The formed blocks, which were found to have a temperature of 60° F., were placed on a pallet, supported on a chain mesh conveyor belt and fed through a gas chamber as seen in the drawings having a height of 16". This chamber was charged with carbon dioxide gas introduced into the chamber through a plurality of tubes 4" apart having a series of 3/64" orifices positioned approximately 1" apart from each other along the top of the chamber. The tubes were approximately 5" from the top of the blocks. The pressure of the carbon dioxide in the chamber was delivered at 2 PSIG at each of the manifolds and at 0° F. from the carbon dioxide source but the pressure inside the chamber was maintained at atmospheric pressure or substantially at 0 PSIG. The speed of the conveyor belt was set at 92" per minute so that the blocks to be cured remained in the chamber for 1–2 minutes. The blocks were found to be fully cured (as defined herein) and could be used for the formation of walls or the like in a building at an earlier time than is customary in the art.

It will be apparent from all of the foregoing that various modifications may be made in the details of construction of the apparatus of this invention, and in the use and operation of the method of this invention, including but not limited to operating with variations in the several parameters, all within the spirit and scope of the invention as recited in the appended claims.

I claim:

1. In an apparatus for the manufacture of concrete and like products having means for blending a desired mixture, means for molding the mixture to desired configurations, and for delivering the shapes thus formed for movement along a predetermined path, conveying means for moving the shapes thus formed to and through a chamber in which the shapes are exposed to carbon dioxide gas during the movement thereof through the chamber, the carbon dioxide gas being fed into the chamber at a controlled pressure, the improvement which comprises a series of spaced tube means along the top of the chamber, each of said tube means having a multiplicity of spaced orifices for feeding carbon dioxide gas into said chamber, said tube means and said orifices being spaced so as to permit water from carbonation and hydration reactions to escape from said shapes during feeding of said carbon dioxide gas.

2. The apparatus of claim 1, including a plurality of pressure control means for controlling the pressure of the gas emitted throughout the chamber means.

3. The apparatus of claim 1, wherein said orifices are about 1/16 inch to about 5/64 inch in diameter.

4. The apparatus of claim 3, wherein said orifices are about 3/64 inch in diameter.

5. The apparatus of claim 1, wherein said orifices are spaced about ¾ inch to about 1½ inch from each other.

6. The apparatus of claim 1, wherein said tube means have a plurality of tubes which are spaced about 4 inches to about 7 inches from each other.

7. The apparatus of claim 6, including means for distributing the carbon dioxide gas from said pressure control means to a plurality of said tubes.

8. The apparatus of claim 1, including means for adjusting the distance of said tube means from the shape.

9. The apparatus of claim 1, wherein said tube means are arranged substantially perpendicular to the direction of travel of the shapes through said chamber means.

* * * * *